Jan. 20, 1931.  A. ELIAS  1,789,675
DIE EXTRUSION METHOD AND APPARATUS
Filed Feb. 8, 1928
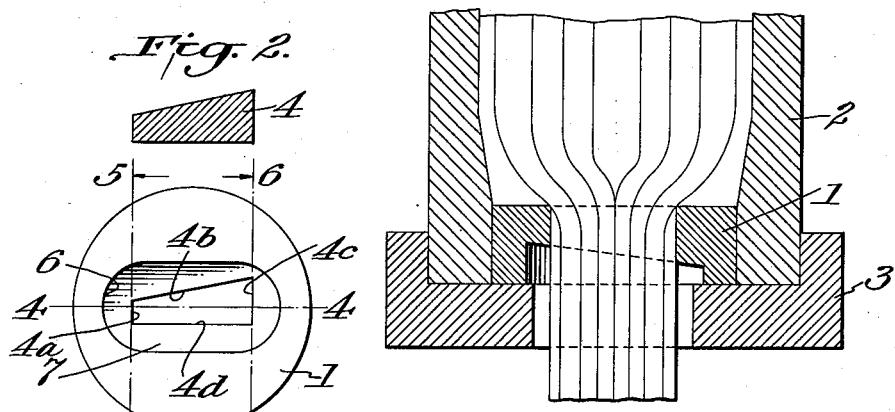
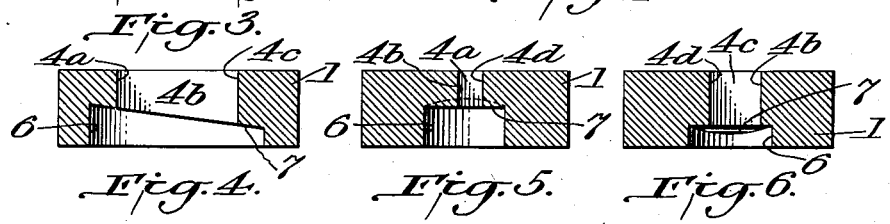
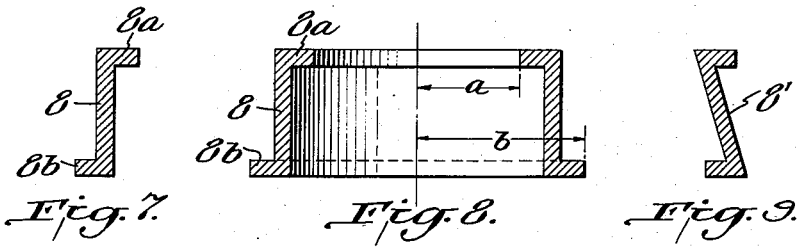
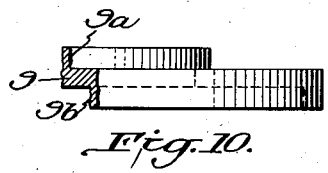
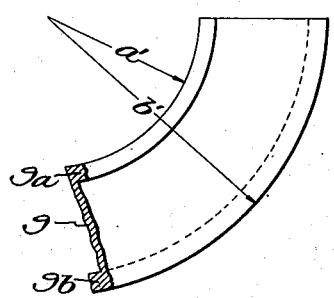
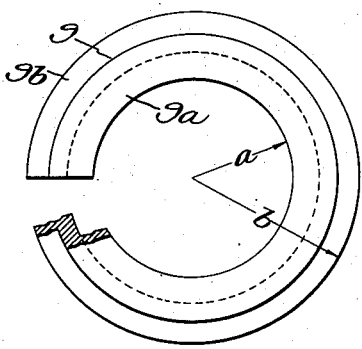
Inventor:
Albert Elias,
By Byrnes Townsend & Brickenstein,
Attorneys Patented Jan. 20, 1931

1,789,675

UNITED STATES PATENT OFFICE

ALBERT ELIAS, OF NIEMEGK, BY BITTERFELD, GERMANY, ASSIGNOR TO I. G. FARBEN-INDUSTRIE AKTIENGESELLSCHAFT, OF FRANKFORT-ON-THE-MAIN, GERMANY, A CORPORATION OF GERMANY

DIE EXTRUSION METHOD AND APPARATUS

Application filed February 8, 1928, Serial No. 252,907, and in Germany February 9, 1927.

This invention relates to a method of and apparatus for the production of structural bars by extrusion through a die, and particularly to the production of bars of irregular thickness.

In the production of structural bars in extruding presses, the shape and size of the cross section of the dies greatly influence the rate of flow of the material issuing from the die. When the die aperture is of irregular shape, the resistance to flow may be much greater at one side of the die than at the other, and the extruded bars will become curved as the metal issues more rapidly at the side of the die where the aperture is of larger cross-section.

Objects of this invention are to provide a method of and apparatus for so determining the relative rates at which metal is extruded through sections of a die aperture that the extruded bars may be straight or may be curved. More particularly, objects of the invention are to provide a method of and apparatus for giving a desired curvature (including zero curvature) to extruded bars by varying the thickness of a die to secure the desired variation in the rates of flow at different portions of the die aperture.

These and other objects of the invention will be apparent from the following specification when taken with the accompanying drawings, in which Fig. 1 is a fragmentary cross-section, through a die embodying the invention, and associated elements of an extrusion press, Fig. 2 is a cross-section of a straight bar of irregular cross-section which may be formed with the apparatus of Fig. 1, Fig. 3 is a bottom view of the die shown in Fig. 1, Figs. 4, 5 and 6 are transverse sections through the die on lines 4—4, 5—5, and 6—6, respectively, of Fig. 3, Fig. 7 is a cross-section of a structural bar which may be used in forming flanged cylinders, Fig. 8 is a central section through a cylinder of type formed from the structural bar of Fig. 7, Fig. 9 is a cross-section illustrating the distortion in profile resulting from an attempt to bend bars of form shown in Fig. 7, Figs. 10 and 11 are fragmentary side and front elevations of curved profile bars which may be used in forming the flanged cylinders of Fig. 8, and Fig. 12 is a plan view, with a part broken away, of the profile bar of Figs. 10 and 11, as bent to form the flanged cylinder.

In the drawings, the numeral 1 identifies a die mounted in the nozzle 2 of an extrusion press by a removable cap 3. The die 1 may be of a disk shape and is provided with an aperture of appropriate cross-section for giving the desired profile to a structural bar. As shown in Fig. 3, the aperture is designed to produce a bar 4 having the cross-section of Fig. 2, and is provided by the four substantially plane walls $4a$, $4b$, $4c$ and $4d$. The die 1 is counterbored at 6, from the bottom or exit face of the die, the bottom wall 7 of the counterbore being so arranged that the bar 4 produced by the die is straight, or is curved in any desired manner.

When the peripheral walls of a die aperture are equally thick all around, the bars produced by a die having an aperture as shown in Fig. 3 will not be straight since the resistance to metal flow is greater at the contracted portion of the aperture than at the broader portion. In accordance with the present invention, the relative rates of flow of metal along the periphery of the die aperture are influenced by friction by varying the length of the contact surfaces which form the aperture and which are in contact with the flowing metal. As shown in Figs. 4, 5, and 6, the surface $4a$, and the portions of surfaces $4b$, $4d$ which form the contracted end of the die aperture are much shorter than the surface $4c$ and the adjacent portions of the surfaces $4b$, $4d$ which form the broader end of the aperture. This variation in the length of the contact surface may be so regulated that the tendency of the bar to curve to the left, Fig. 1, will be exactly neutralized, that is, the extruded bar will be straight. Moreover, if the production of bars with a definite curvature should be desired the length of the contact surfaces may be so proportioned as to curve the bar issuing from the press in any desired direction.

This method of regulating the curvature of a structural bar by varying the relative dimension of different portions of the peripheral walls of the die aperture can be used to advantage in the production of profile bars which are subsequently intended to be curved so as to form cylindrical bodies or surfaces. That is, I have employed bars having the profile of a double-L, such as bar 8 of Fig. 7, in the manufacture of double-flanged cylinders of the general form shown in Fig. 8. In turning the bar 8 into circular form the flange 8a must be upset and contracted to form the inturned flange 8a, of radius a, of the cylinder, while the flange 8b must be elongated to form the cylinder flange 8b of radius b. In this operation, the profile of the bar is more or less distorted, and will take the general shape of the bar 8', as shown in Fig. 9.

For the purpose of properly correlating relative shape and the masses of material along the two flanges of the structural bar, and thus preventing distortion of the web member or cylindrical wall, the profile bar, according to the present invention, may be initially formed as an extruded bar which is longitudinally curved to the desired extent. By suitably adjusting the relative dimensions of the contact surfaces which define the die aperture, the structural bar may be curved edgewise to form the sector-shaped plate 9 having flanges 9a and 9b, as shown in Figs. 10 and 11. The radii a', b' of the respective flanges of the sector plate are not the same as the corresponding radii, a, b of the finished cylinder 9, Fig. 12, but are so related thereto that the stresses set up to bend the sector into cylinder form will have substantially no tendency to deform the web wall of the cylinder.

If the curvature produced by the relative dimensioning of the contact surfaces of the die is not sufficient, a guide roller may be positioned at the mouth of the extrusion press to assist in the bending operation, the roller being provided with a suitable means for adjusting the pressure exerted on the structural bar.

It will be apparent that the invention is not restricted to the production of profile bars of the forms illustrated in the drawings, or to the formation of extruded bars which are initially curved in one plane, and thereafter curved into cylindrical form. The particular curvature to be given to a bar during the extrusion step for facilitating the formation of curved bodies will be determined, of course, by the profile of the bar and the shape of the finished article.

Extrusion dies made in accordance with the present invention are specially suitable for dealing with magnesium alloys.

I claim:

1. The process of extruding a metallic bar in which flowing metal is subjected to a force applied in the direction of flow of the metal and is subjected to laterally restrictive shaping forces, characterized by the fact that at different peripheral portions of the flowing metal the said shaping forces are applied to unequal longitudinal portions of said flowing metal.

2. In extrusion apparatus for the formation of structural bars a die having an opening therethrough, the shape and size of the periphery of one end of said opening corresponding to the cross-section of the bar to be produced, and the walls of the opening vertically extending from said periphery being of unequal length, the portions of the walls extending from the portions of the periphery having a larger cross-section, being greater in length.

3. In extrusion apparatus, a die having an opening therethrough, the periphery of the entrance edge of the opening corresponding in shape to the cross-section of the bar to be produced, and different portions of the inner walls of said opening extending from said periphery in the direction of flow of the metal being of different lengths.

In testimony whereof, I affix my signature.
ALBERT ELIAS.